(12) United States Patent
Yagi

(10) Patent No.: US 8,184,328 B2
(45) Date of Patent: May 22, 2012

(54) PRINTING APPARATUS AND CONTROL METHOD FOR AUTHENTICATING A USER FOR OPERATING THE APPARATUS

(75) Inventor: Yuichi Yagi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 11/952,164

(22) Filed: Dec. 7, 2007

(65) Prior Publication Data

US 2008/0144105 A1 Jun. 19, 2008

(30) Foreign Application Priority Data

Dec. 14, 2006 (JP) ................. 2006-337586

(51) Int. Cl.
*G06F 15/00* (2006.01)
(52) U.S. Cl. ............. 358/1.16; 358/1.14; 358/1.15
(58) Field of Classification Search ........... 358/1.14
See application file for complete search history.

(56) References Cited

U.S. PATENT DOCUMENTS

| | | | | |
|---|---|---|---|---|
| 7,707,327 | B2 * | 4/2010 | Namba .................... | 710/32 |
| 2003/0217357 | A1 * | 11/2003 | Parry ....................... | 717/168 |
| 2004/0225923 | A1 * | 11/2004 | Teegan et al. ............ | 714/38 |

FOREIGN PATENT DOCUMENTS

| | | |
|---|---|---|
| JP | 2000-216944 | 8/2000 |
| JP | 2002-204325 | 7/2002 |
| JP | 2004-157306 | 6/2004 |
| JP | 2004-221933 | 8/2004 |
| JP | 2005-212436 | 8/2005 |
| JP | 2006-4137 | 1/2006 |
| JP | 2006-107376 | 4/2006 |

OTHER PUBLICATIONS

Maruta et al., Japan Patent Application Publication 2006-107376 (machine translation), Apr. 20, 2006.*
Fukuda, Japan Patent Application Publication 2006-004137 (machine translation), Jan. 5, 2006.*
Japanese Office Action dated Dec. 5, 2008, regarding Application No. 2006-337586.

* cited by examiner

*Primary Examiner* — Benny Q Tieu
*Assistant Examiner* — Qian Yang
(74) *Attorney, Agent, or Firm* — Fitzpatrick, Cella, Harper & Scinto

(57) ABSTRACT

In a case that it is detected that an external memory is attached to a printing apparatus and that neither the access to the external memory nor a user operation occurs within a predetermined time period, an alert is issued to the effect that the external memory is left in place in the printing apparatus. Following the alert, the printing apparatus prohibits execution of the functions that use the external memory.

6 Claims, 11 Drawing Sheets

PRINTING APPARATUS AND CONTROL METHOD FOR AUTHENTICATING A USER FOR OPERATING THE APPARATUS

BACKGROUND OF THE INVENTION

1. Field of the Invention

The present invention relates to a printing apparatus to which an external memory, such as a Universal Serial Bus (USB) memory or a memory card, for example, can be attached, and a control method thereof.

2. Description of the Related Art

In recent times, a multi-function peripheral (MFP), which is a type of image forming apparatus possessing such functions as a printer function, a copy function, a fax function, and a scanner function, is widely used in venues such as offices. An MFP has been proposed with a connector to which a USB memory or a memory card, i.e., a removable medium, which can be used via a common standard that is shared with another peripheral, can be attached. The MFP is capable of extracting and printing or faxing information that is stored in the removable medium that is plugged into the connector. It would also be possible to save image data that is obtained by the MFP's scanner into the attached removable medium. A very high degree of functional usability is thus achieved, because it is possible to store the image data into the removable medium without having to resort to a personal computer or other device.

If, after carrying out a function on the MFP that relates to the removable medium, however, a user fails to remove the removable medium that is inserted into the connector of the MFP, another user may come into possession of the information that is stored on the medium. Consequently, a countermeasure against the forgetting to remove the removable medium is necessary.

A method has been proposed of preventing the removable medium being left in place in an image forming apparatus that prints the information from the attached removable medium. For example, a stored data output apparatus has been proposed in Japanese Patent Laid-Open No. 2006-107376 that determines whether the removable medium is attached when a command is inputted such as a copy command, and if the medium is attached, prohibits an operation corresponding to the command that has been inputted. It would also be possible for the stored data output apparatus to alert the user that the removable medium remains attached thereto.

The stored data output apparatus that possesses the function that alerts the user that the removable medium remains attached thereto, however, does not restrict the recipient of the alert to the owner of the medium. It is possible that, when the removable medium is attached, the notification that the medium is still attached may be issued to a user other than the owner of the medium. Accordingly, the risk that as the information on the removable medium is exposed to a user other than the owner of the medium increases by issuing the alert that the medium has not been removed. The conventional technology thus provides an inadequate countermeasure against leaving the removable medium in place.

SUMMARY OF THE INVENTION

An aspect of the present invention is to eliminate the above-mentioned conventional problems.

A feature of the present invention is an ability to prohibit access to an external memory by a user other than the owner thereof, if the owner fails to remove the external memory.

Another feature of the present invention is an ability to reliably notify the owner of the external memory of leaving the external memory in place.

According to the present invention, there is provided a printing apparatus having a print unit adapted to print an image on a print sheet in accordance with image data, the apparatus comprises:

an input unit configured to input an instruction for operating the printing apparatus based on an operation by a user;

a memory connection unit configured to removably connect an external memory;

a detection unit configured to detect whether or not the external memory is attached to the memory connection unit; and a control unit configured to control the print unit to execute a print process based on the image data stored in the external memory, in a case where a print instruction is inputted by the input unit to execute the print process based on the image data stored in the external memory.

The control unit also prohibits the print process based on the image data stored in the external memory, in a case where the detection unit detects that the external memory is attached and the printing apparatus is in a prescribed operating state.

According to the present invention, there is provided a control method of a printing apparatus having a print unit configured to print processing an image on a print sheet in accordance with image data, the method comprises the steps of:

inputting an instruction for operating the printing apparatus based on an operation by a user;

detecting whether or not the external memory is attached; and controlling the print unit to execute the print process based on the image data stored in the external memory, in a case where a print instruction is inputted in the inputting step to execute the print process based on the image data that is stored in the external memory.

In the controlling step, the execution of the print process based on the image data stored in the external memory is prohibited, in a case where it is determined in the determining step that the external memory is attached and the printing apparatus is in a prescribed operating state.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will be described hereinafter in detail with reference to the accompanying drawings. The following embodiments are not intended to limit the claims of the present invention, and not all combinations of features described in the embodiments are essential to the solving means of the present invention.

Figure 1:
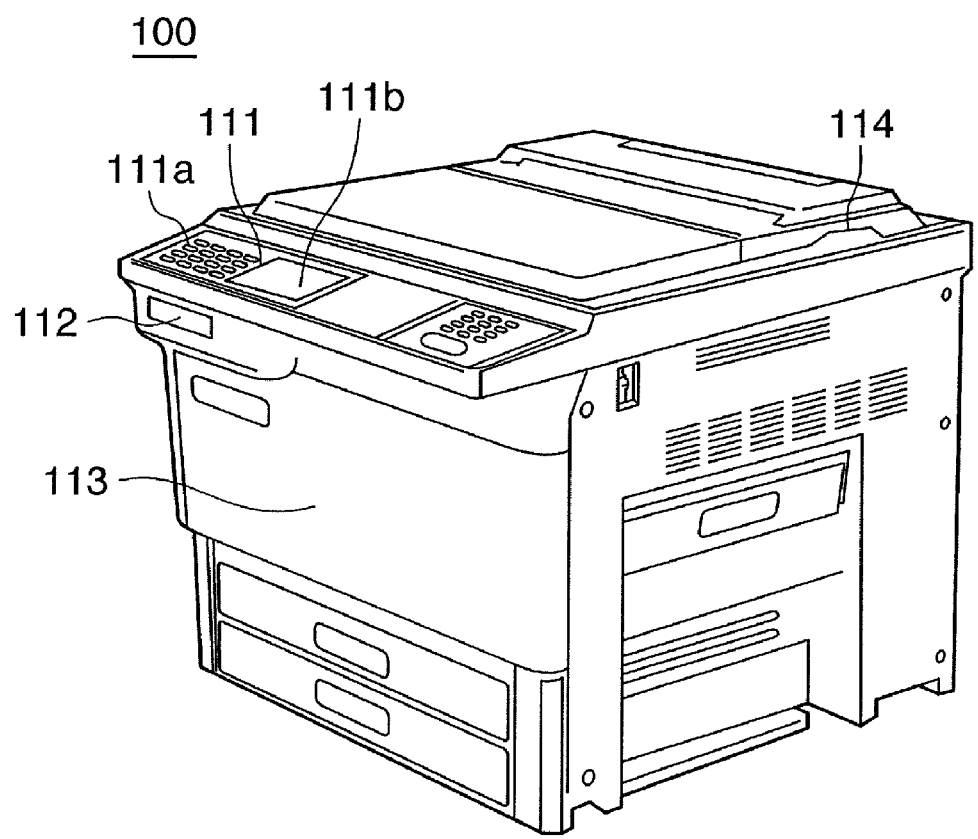
FIG. 1 depicts an external view of an image forming apparatus (MFP) according to an exemplary embodiment of the present invention.

FIG. 1 depicts an external view of an image forming apparatus (MFP) according to an exemplary embodiment of the present invention. For example, it would be an external view of a multifunction printer (MFP) that would be exemplary for applying the embodiment. It is to be understood that a print method of the MFP is not restricted to an electrophotographic method such as a laser printer, and that another print method would be permissible. It would also be permissible for the image forming apparatus to be a print apparatus rather than the MFP.

The MFP 100 comprises a removable media interface 112 that is capable of attaching a removable medium, such as a USB memory or a memory card, and accessing the memory thereupon. Connecting to the USB memory or other removable medium (hereinafter "external memory") via the removable media interface 112 allows a bidirectional transmission and reception of information between the external memory and the MFP 100. The removable media interface 112 functions, for example, as a memory connection unit such as a connector or a slot for the USB memory or the memory card, as well as an access unit that accesses an external memory 325 in FIG. 2.

The MFP 100 comprises a console unit 111. It is possible to use the console unit 111 to input, by a user operation, commands, as well as such data as text and numerals. The console unit 111 comprises an operation unit 111*a*, which comprises for example a plurality of keys that are used by the user to input a command and data, and a display unit 111*b*, such as an LCD, which displays to the user information, such as information relating to a direction menu or an obtained image. The display unit 111*b* also performs a touch panel function, which displays a menu, such as the command menu and a software button, and allows the user to input the command by touching the menu or the command element. The MFP 100 also comprises a scanner unit 114, which optically reads an original to obtain image data, and a print unit (printer engine) 113, which prints an image on a recording sheet in accordance with the image data.

Figure 2:
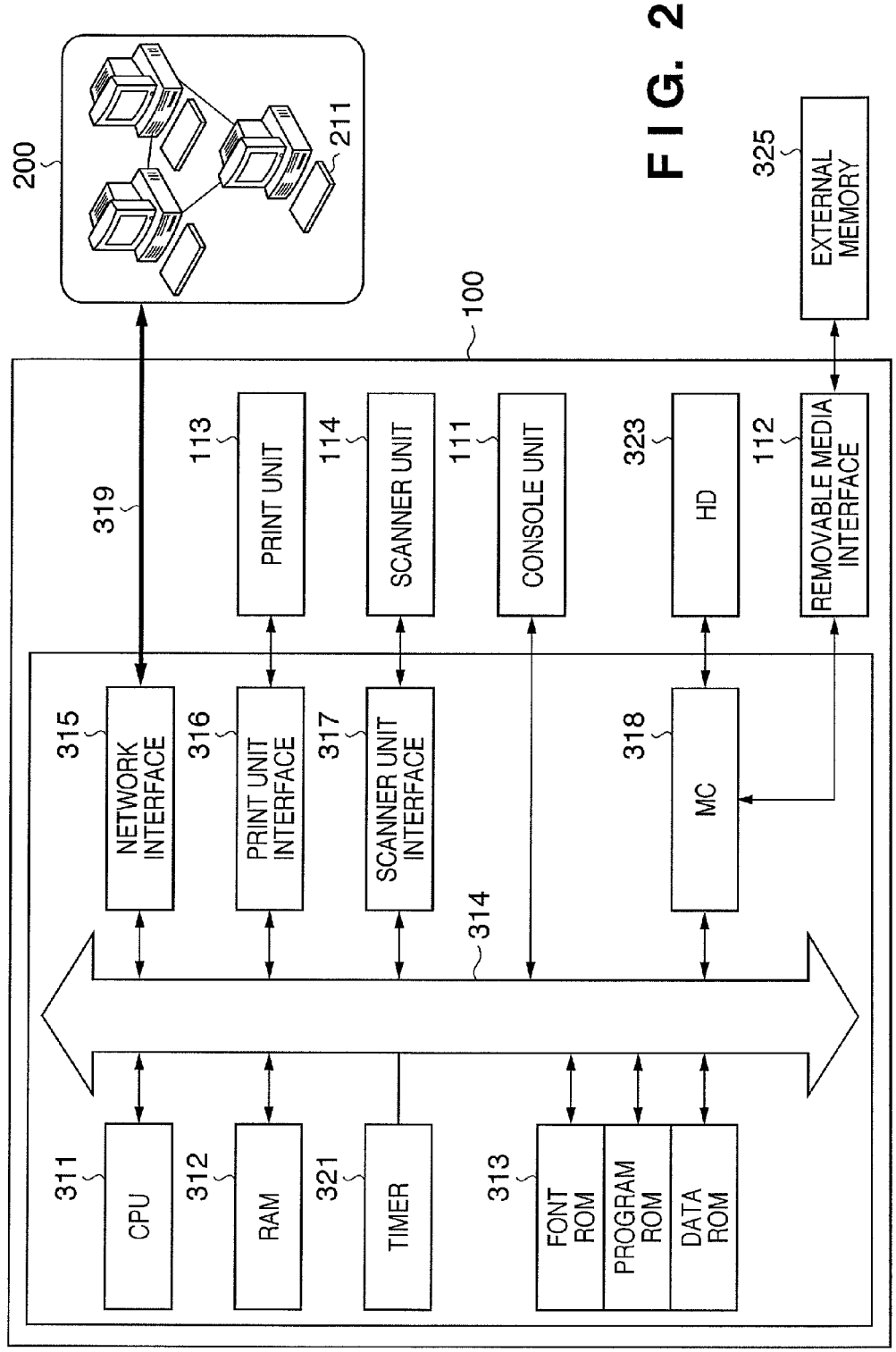
FIG. 2. is a block diagram illustrating a hardware configuration of the MFP according to the embodiment.

FIG. 2. is a block diagram illustrating a hardware configuration of the MFP according to the embodiment.

A CPU 311 in FIG. 2 controls each respective device that is connected to a system bus 314, in accordance with such as a control program that is stored in a program ROM of a ROM 313, or a control program that is stored in a hard disk drive 323. The CPU 311 controls access between the devices, as well as controlling the print unit 113 that is connected via a print unit interface 316 to output print data and print it. The image data that is read by the scanner unit 114 is inputted via a scanner interface 317. The program ROM of the ROM 313 may store a program such as a control program of the CPU 311 as is depicted in a flowchart according to the embodiment. A font ROM of the ROM 313 stores data such as font data that is used when generating the print data that is outputted to the print unit 113. The data ROM of the ROM 313 stores a program such as a boot program and information that is used by a host computer 211 over a network 200.

The CPU 311 is capable of performing a communication process over a network interface 315 with the host computer 211. The network interface 315 is configured to be capable of connecting to, via a network communication path 319, the network 200, such as the Internet.

A RAM 312 functions as such as a main memory or a workspace of the CPU 311, and is configured such that its memory capacity may be expanded by way of an optional RAM board that is connected to an expansion port (not shown). The RAM 312 is also used as a region for rendering output information. A nonvolatile memory area (NVRAM) is also present, for storing a region such as an environment data storage region, authentication information, an ID, or an e-mail address of the user or an administrator (to be described hereinafter), in a nonvolatile state. If the optional hard disk drive 323 is provided, it would be permissible for the information that is stored in a nonvolatile manner to be stored thereupon. Access to the hard disk drive 323 is controlled by a memory controller 318. The hard disk drive 323 is optionally connected, and stores data, such as the font data, an emulation program, and form data. It would be possible to attach a plurality of types of the external memory 325 that is connected via the removable media interface 112, rather than one type. It would be permissible for the external memory to be to be a memory that stores data, such as an optional font, in addition to a built-in font, or a program that interprets a linguistically different printer control language. A configuration is permissible that allows simultaneously connecting the plurality of external memories.

The console unit 111 contains elements, such as a switch, an LED, and the display unit 111*b*, for control purposes. It would be permissible to store printer mode setting information in the NVRAM of the RAM 312 that is set via the console unit 111. The scanner unit 114 is an original reading unit, which optically reads data such as an original, and outputs the read image data to the system bus 314, via the scanner interface unit 317. The network communication path 319 is configured to allow communication with the network 200 via a prescribed protocol. The network 200 is connected to a plurality of personal computers (PC) 211.

The removable media interface 112 comprises a USB connector or a card memory slot. The interface 112 is capable of accessing the external memory 325 and either reading out the information stored therein, or storing data in the memory by writing the data thereto. The removable media interface 112 comprises a detector (detection unit) that detects whether or not the external memory 325 is attached. It detects an attachment state of the external memory 325, and notifies the CPU 311 thereof. Upon receipt of the notification, the CPU 311 controls the apparatus so as to allow the executing of a function that uses the external memory 325. For example, the CPU 311 allows executing such a function as reading the image data that is stored in the external memory 325 and printing the image data on the print unit 113, i.e., a direct print function, or saving the image data that is obtained by the scanner unit 114 to the external memory 325, i.e., a scan-to-memory function. When the functions are executable, the CPU 311 displays data such as the menu or the command that selects the function on the display unit 111b of the console unit 111. The card slot of the removable media interface 112 is configured of a memory slot that corresponds to a plurality of types of standardized media. A configuration would be permissible that allows a connection such as, for example, an SD memory card, a Compact Flash™, a memory stick, or a Flash Memory™, in place of the memory card. A timer 321 performs operations, such as keeping a specified time and measuring of a date and time, in accordance with a command from the CPU 311.

It would be permissible for the information that is stored in the external memory 325 to be, for example, a data file that is created when the user executes an application that is installed on the host computer. It would be permissible, for example, to include image data, graphics data, text data, or a combination of each respective type of data, as well as image data that is captured with a digital camera.

Figure 3:
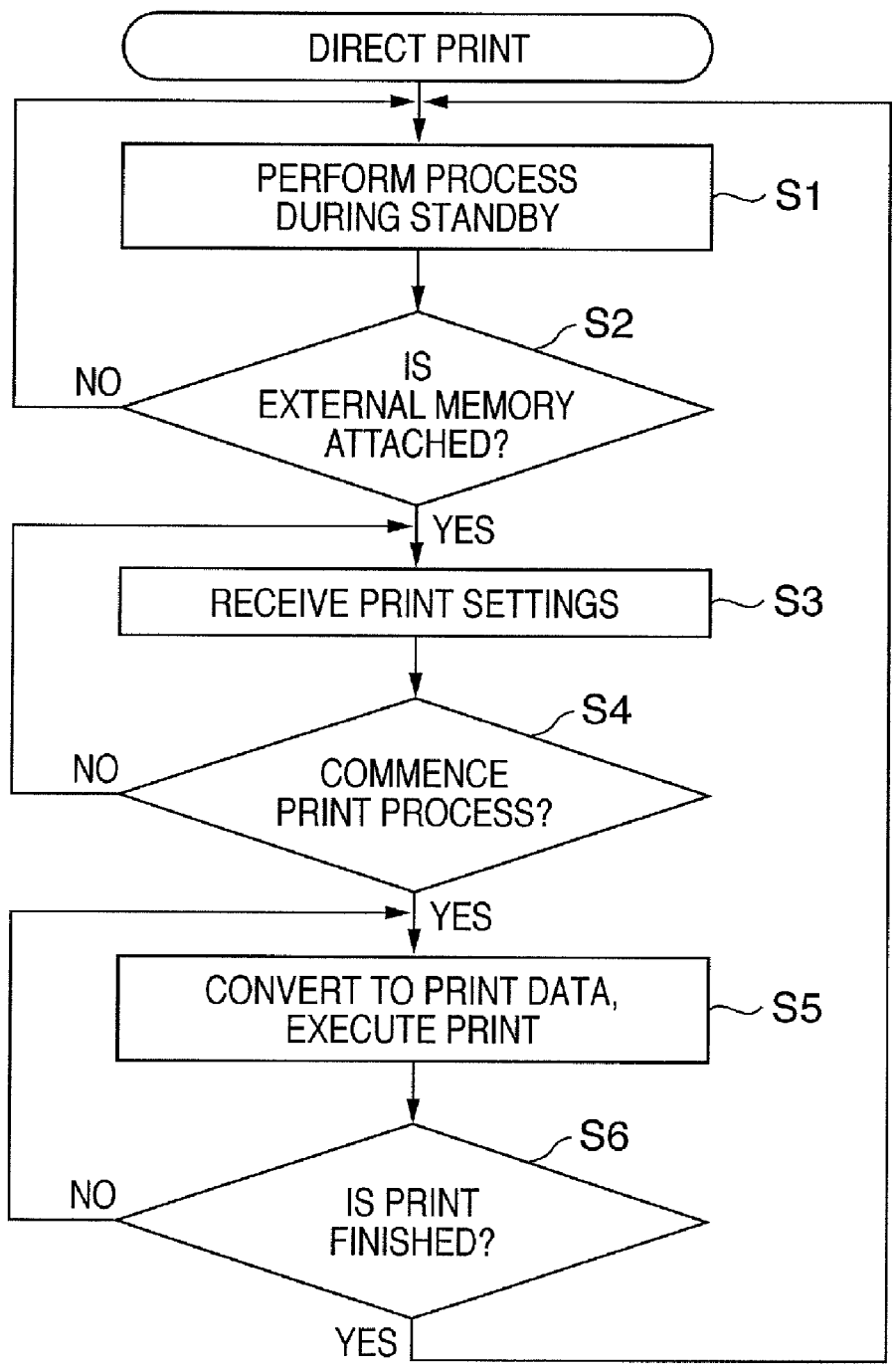
FIG. 3 is a flowchart explaining an example of a process of a function that uses an external memory pertaining to the MFP, according to the embodiment of the present invention.

FIG. 3 is a flowchart explaining an example of a process of a function that uses the external memory 325 pertaining to the MFP 100, according to the embodiment of the present invention. A program that executes the process is stored in the program ROM, and the process sequence corresponds to the direct print sequence that the CPU 311 executes in accordance with the control program that is stored in the ROM 313 or the hard disk drive 323. Each step depicted in FIG. 3 is implemented by the CPU 311 in accordance with the program that is stored in the ROM 313, or the program that is loaded in the RAM 312 from the hard disk drive 323. The software that the CPU 311 of the MFP 100 executes has a multitasking software configuration that operates a plurality of process tasks in parallel.

In step S1, the MFP 100 performs each respective process while in a standby state for receiving data from the host computer 211, and waits for a print command from a user. The process then proceeds to step S2, where the CPU 311 of the MFP 100 monitors a detection signal from the removable media interface 112, and determines whether or not the user has attached the external memory 325 thereto. If it is determined that the external memory 325 is attached, then the process proceeds to step S3. If not, the process returns to step S1.

If the external memory 325 is attached, the process proceeds to step S3, where the CPU 311 of the MFP 100 performs a preview display process of image data stored in the external memory 325 that is attached to the removable media interface 112, and receives a selection command of the image data of the external memory 325, as well a command as such as a command of the print settings for the image data to be printed, in accordance with the selection command, which can specify the number of copies, an enlargement or a reduction, or a finishing specification. For example, all of the settings that the user typically performs when printing, such as the number of copies or a degree of enlargement or reduction, are performed in step S3.

The process then proceeds to step S4, where the CPU 311 of the MFP 100 determines whether or not it has been commanded to commence the print process. The CPU 311 determines whether or not the user has issued a print commencement command in the console unit 111, in accordance with an operation of an element such as a start button of the console unit 111. If the CPU 311 determines that the print commencement command has been issued, the process proceeds to step S5, whereas if the CPU 311 determines that the print commencement command has not been issued, the process returns to step S3, and waits for the print command from the user.

In step S5, the CPU 311 converts the image data stored in the external memory 325 into print data that the print unit 113 is capable of printing, and stores it in the RAM 312. The CPU 311 outputs the print data so as to be printed to the print unit 113. According to the embodiment, the conversion of the image data into the print data properly includes converting a file format, for example, from image data such as PDF, TIFF, or JPEG, into raster image data that the print unit 113 is capable of printing. Finally, the process proceeds to step S6, where the CPU 311 determines whether or not the print process is finished, in accordance with the command that was set in step S3, such as the number of copies to print. If it is determined herein that the print process is not finished, the process returns to step S5, and the process therein is repeated. If, on the other hand, it is determined in step S6 that the print process is finished, the process returns to step S1, and a status of waiting for a command from the user.

If it thus detected that the external memory 325 is attached, it becomes possible to execute the function that uses the external memory 325, the direct printing operation in the present embodiment.

Figure 4:
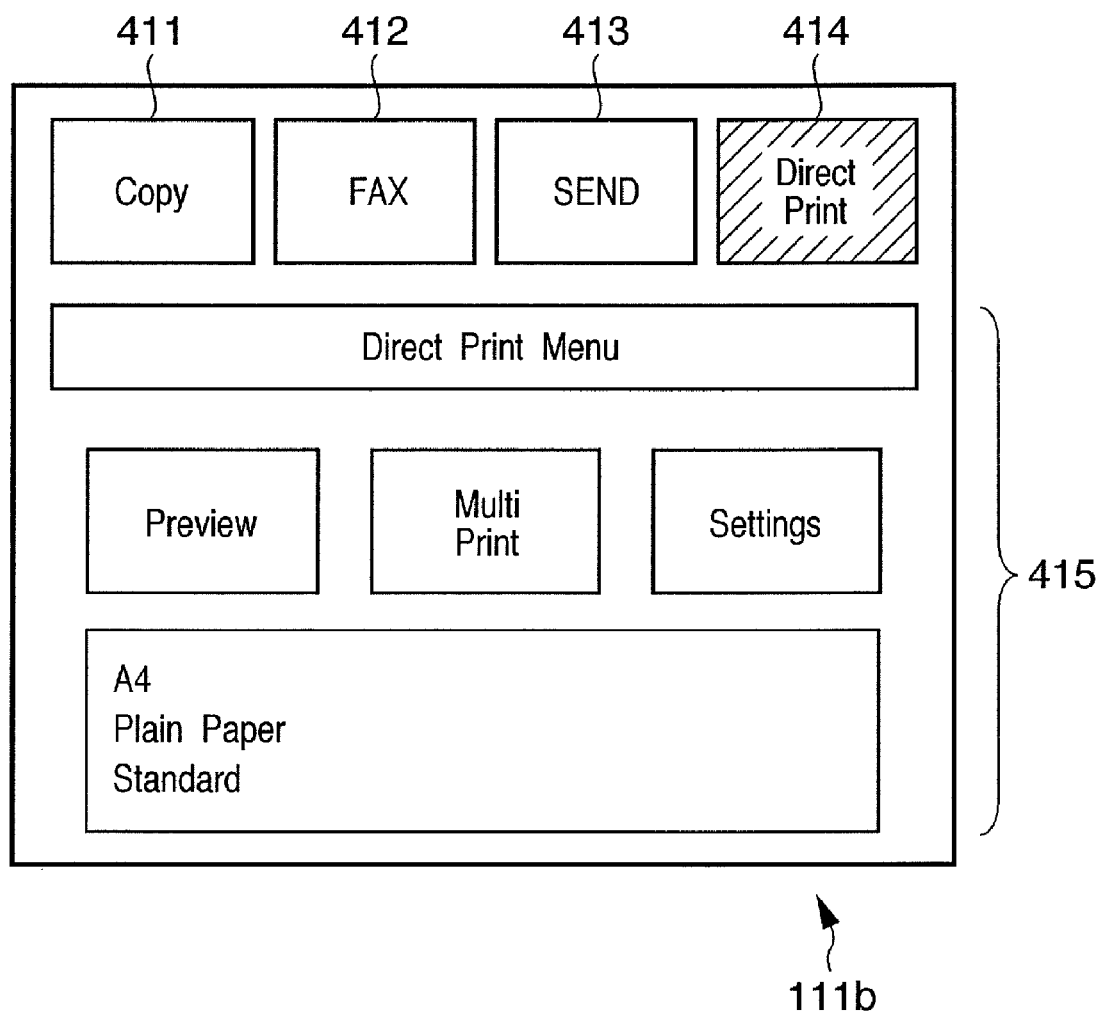
FIG. 4 depicts a view illustrating an example of a window that is displayed on a display unit of a console unit of the MFP, according to the embodiment.

FIG. 4 depicts a view illustrating an example of a window that is displayed on the display unit 111b of the console unit 111 of the MFP 100, according to the embodiment. The window denotes a display example of, for example, what is displayed in step S3 of FIG. 3, under the control of the CPU 311, when the attachment of the external memory 325 is detected.

In FIG. 4, reference numerals 411-414 denote a menu display of functions of the MFP 100, i.e., copy, fax, transmit data, and direct printing. The direct print display 414 is displayed only when the external memory 325 is attached. Reference numeral 415 denotes an area that displays a menu corresponding to the function that is selected from among the function menus 411-414. FIG. 4 depicts a state wherein the direct printing function is selected. Displayed in the area 415 are such command items as the direct printing menu, a print preview, and print settings. In the present circumstance, the setting is to print on a plain paper of A4 size, in a standard form.

Figure 5:
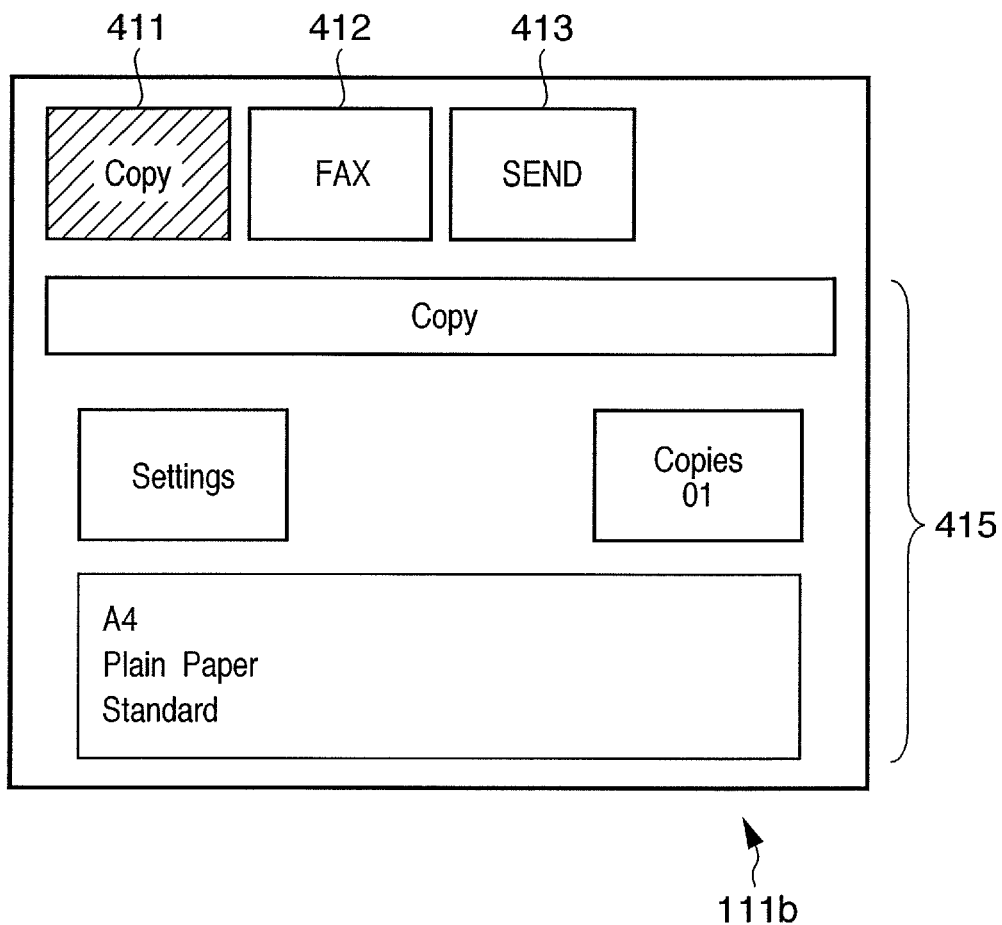
FIG. 5 depicts a view illustrating an example of a window that is displayed on the display unit of the console unit of the MFP when nothing is attached to a removable media interface, according to the embodiment.

FIG. 5 depicts a view illustrating an example of a window that is displayed on the display unit 111b of the console unit 111 of the MFP 100 when nothing is attached to the removable media interface 112, according to the embodiment. In FIG. 5, the copy function has been selected. Elements in FIG. 5 in common with FIG. 4 are denoted with identical reference numerals in FIG. 4.

In the present circumstance, the area 415 displays a menu corresponding to the selected copy function 411. In FIG. 5, the external memory 325 is not attached to the removable media interface 112, and thus, the direct printing function menu, reference numeral 414 in FIG. 4, which reads image data from the external memory 325 and prints the read image data, is not displayed.

Figure 6:
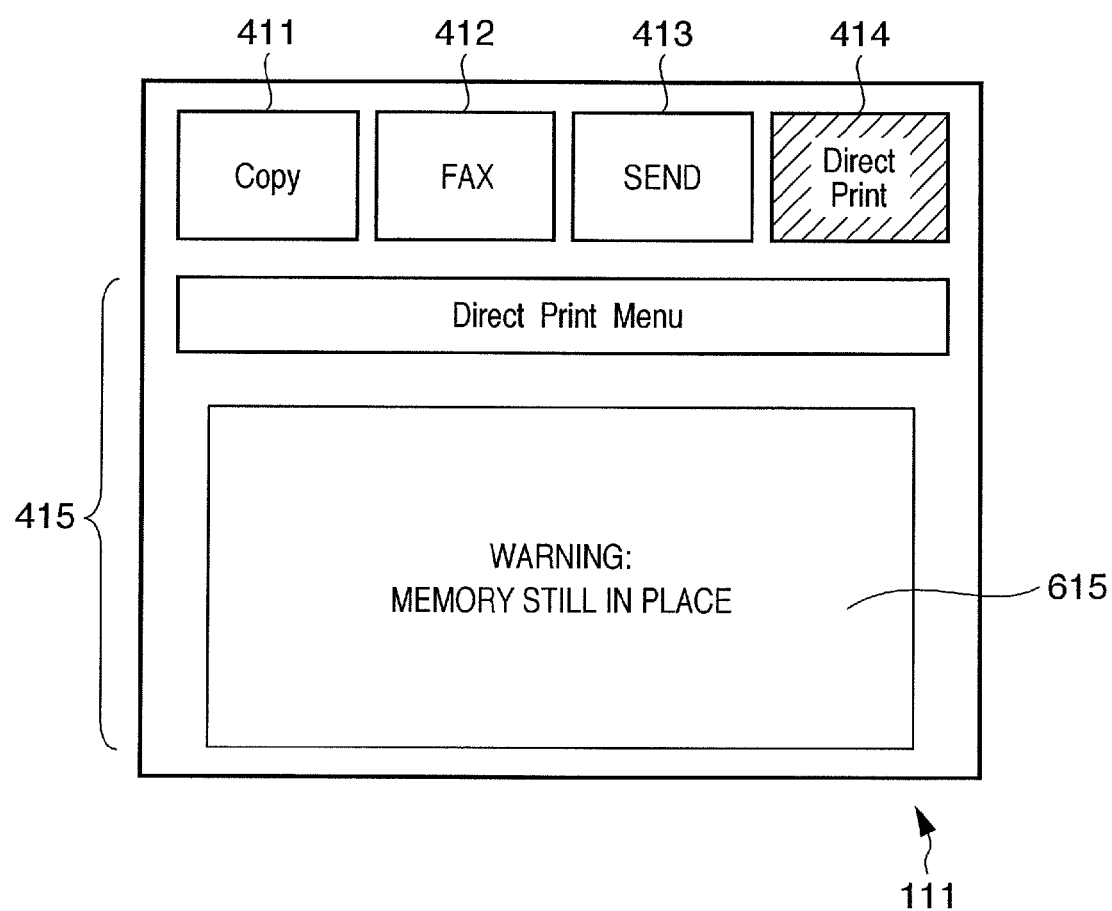
FIG. 6 depicts a view illustrating an example of a window that is displayed on the display unit of the console unit of the MFP when it is determined that the external memory has been left in place, according to the embodiment.

FIG. 6 depicts a view illustrating an example of a window that is displayed on the display unit 111b of the console unit 111 of the MFP 100 when it is determined that the external memory 325 has been left in place, according to the embodiment. Elements in FIG. 6 in common with FIG. 4 are denoted with identical reference numerals.

In FIG. 6, reference numeral 615 denotes a message that alerts the user that the user has failed to remove the external memory 325. The displayed message relates to the direct print display 414, and thus, the menu display of the direct printing function 414 is highlighted.

In the present embodiment, the determination of whether or not the external memory 325 has been left in place is performed as follows. The determination is performed if a function that accesses the external memory 325 is not performed within a predetermined time period. For example, after execution of the direct printing function using the external memory 325, it is presumed that the external memory 325 remains attached and connected, and if either the external memory 325 is not accessed, or if an operation is not performed using the operation unit 111a, within a predetermined time period, then the determination is performed. It is presumed that the predetermined time period may be specified at will by the user via the operation unit 111a. It is desirable that the prescribed time be set as short as possible, for example, less than one minute.

Figure 7:
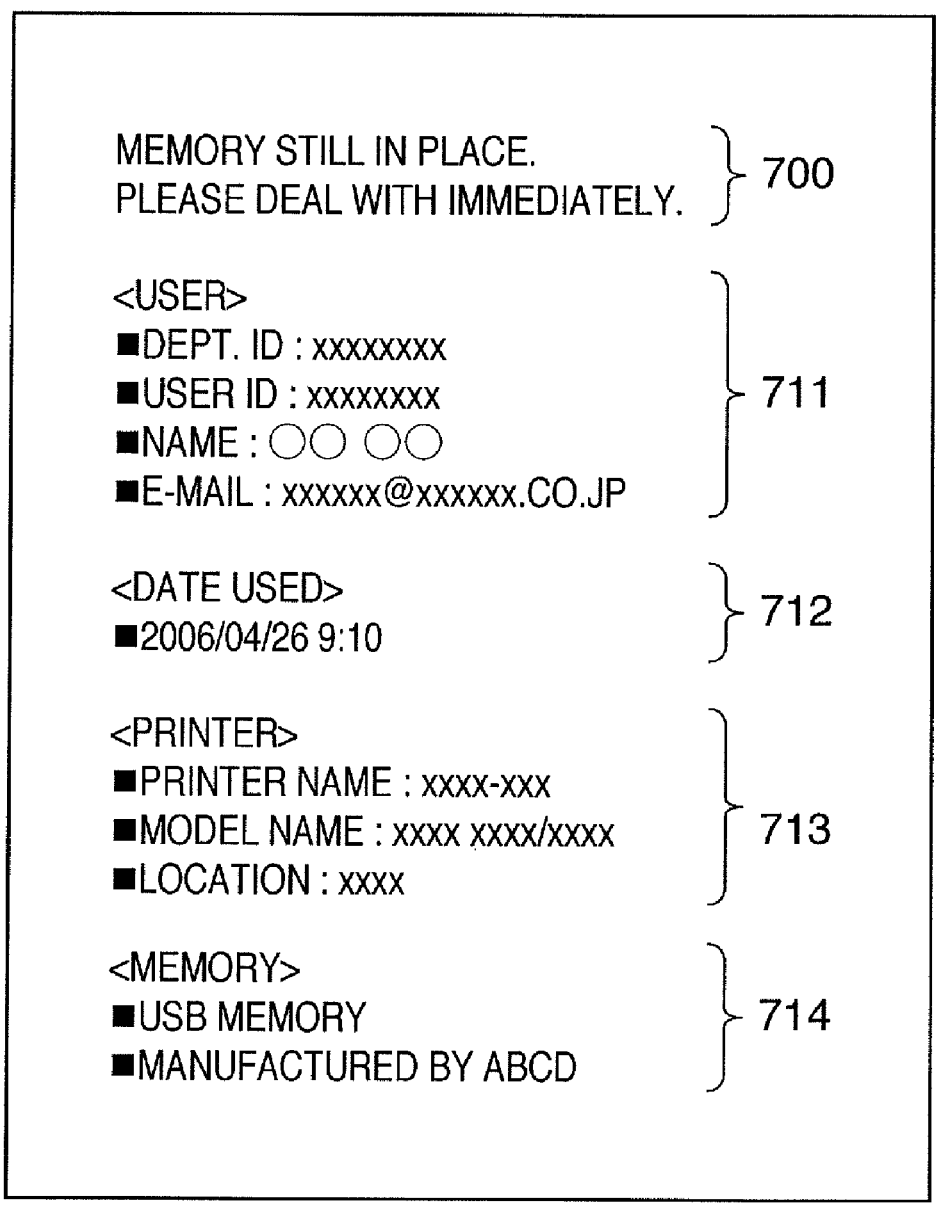
FIG. 7 depicts a view illustrating an example of text data that notifies for example, the user or an administrator that the external memory has been left in place in the MFP, when it is determined that the external memory has been left in place, according to the embodiment.

FIG. 7 depicts a view illustrating an example of text data that notifies a person such as the user or the administrator, via a communication mode such as an e-mail, that the external memory 325 has been left in place on the MFP 100, when it is determined that the external memory 325 has been left in place, according to the embodiment.

In FIG. 7, reference numeral 700 denotes an example of a message that informs the user that the external memory 325 remains attached, and that the external memory 325 has been left in place. Reference numeral 711 denotes user information created based on registration information of the user (or a user department, hereinafter simply denoted as "user"). Reference numeral 712 denotes date and time information when the MFP 100 determines that the external memory 325 has been left in place. Reference numeral 713 denotes information such as a name, a model, and an installation location of the MFP 100. Reference numeral 714 denotes memory information created from data of the attached external memory 325. In the present embodiment, it would be possible to notify the user more promptly by registering a cellular phone e-mail address of the user as the e-mail address thereof.

Figure 8:
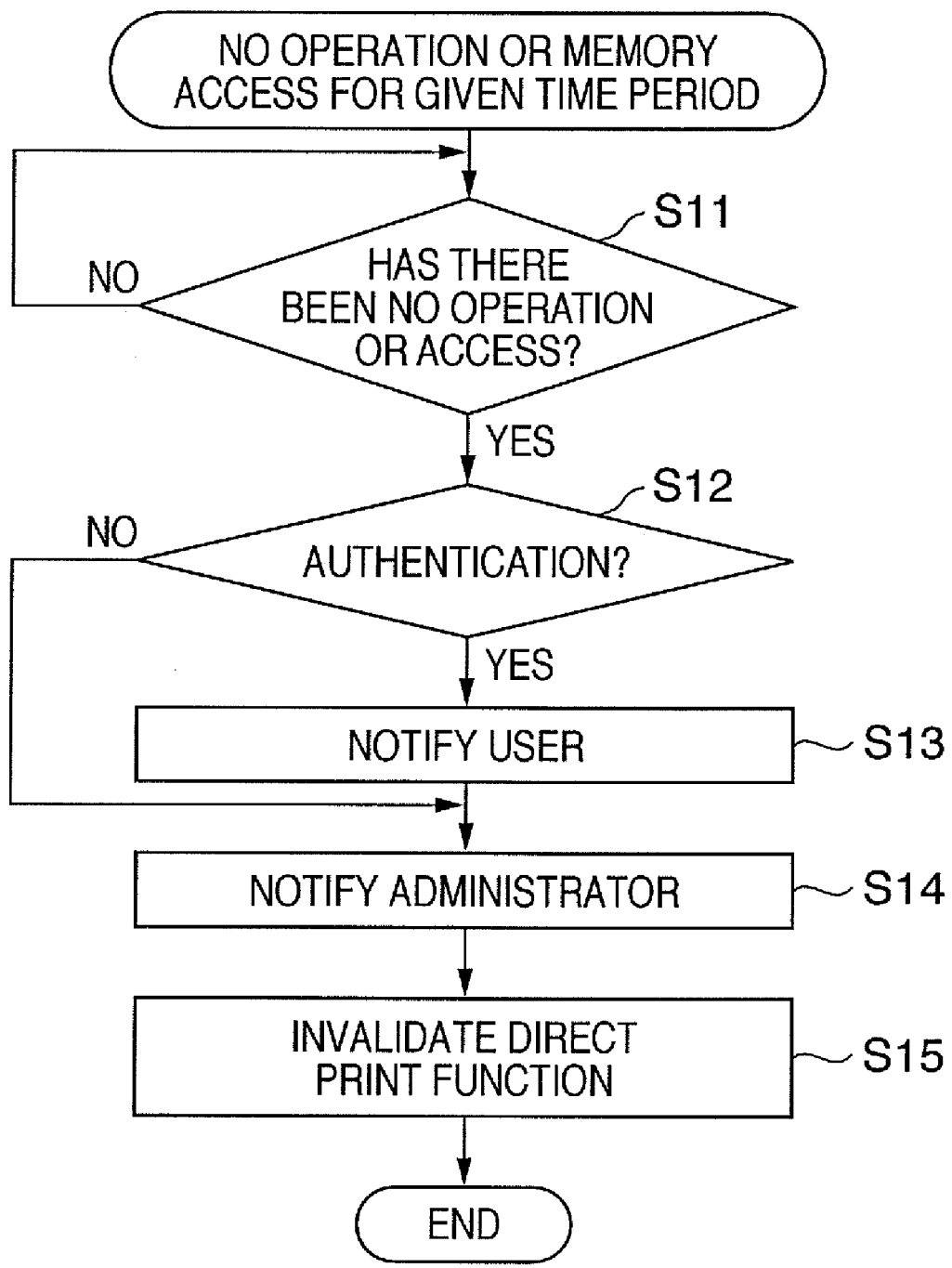
FIG. 8 is a flowchart explaining a control process of the external memory being left in place in the MFP, according to the embodiment.

FIG. 8 is a flowchart explaining a control process of the MFP according to the embodiment, in a case where external memory 325 is left in place in the MFP 100. A program that executes the process is stored in either the ROM 313 or the hard disk drive 323, and is executed under the control of the CPU 311. The flowchart corresponds to a task sequence that invalidates the function that uses the external memory 325 by the CPU 311. The task is activated when the external memory 325 remains attached and connected, and either the external memory 325 is not accessed, or the operation is not performed via the operation unit 111a of the MFP 100, within a predetermined time period.

In step S11, the CPU 311 determines whether or not the external memory 325 has been accessed within a predetermined time period, under a status that the determination has been made that the external memory 325 is attached. If it is determined that there has been no access to the external memory 325, or no operation, within the predetermined time period, the process proceeds to step S12. If not, the process goes into a standby mode in step S11, until a predetermined time period has elapsed. The user may set the predetermined time period using the console unit 111. The determination of the passage of the predetermined time period is made using the timer 321. The time that is thus set is stored in a memory such as the NVRAM or the hard disk drive 323.

In step S12, it is determined whether or not the user is authenticated. If so, the process proceeds to step S13. If not, the process proceeds to step S14. The authentication of the user, is performed by registering data such as an ID, a password, and an e-mail address of the user in either the NVRAM or the hard disk drive 323 prior to use. A login window is displayed on the display unit 111b of the console unit 111. The user is authenticated by matching the ID and the password of the user, that are inputted therein, against the stored registration information. A permission for the usage of the MFP 100 by the user is either granted or prohibited in accordance with a result of the authentication. Only the user who is thus granted permission may use the MFP 100.

In step S13, text data with content such as is depicted in FIG. 7 is created, based on the registration information of the authenticated user. The e-mail address or other destination in the registration information of the authenticated user, is notified of the text data, via a communication unit such as e-mail.

In step S14, the administrator who is registered in a memory, such as the hard disk drive 323 is also notified, via the communication unit and via a communication mode such as e-mail, of the external memory 325 being left in place. It is presumed that the administrator has registered data such as an administrator ID, a password, and an e-mail address in either the NVRAM or the hard disk drive 323. It is possible to notify the registered administrator e-mail address when a fault occurs with the MFP 100 by performing an authentication of the administrator ID to register the user.

The process proceeds to step S15, wherein the function, for example a direct print function, that uses the external memory 325 is invalidated. For example, the control window showing the status of the external memory 325 being attached, such as shown in FIG. 4, is changed to the control window that is the same as the status of the external memory 325 not being attached, such as is depicted in FIG. 5. It is thus impossible to command the execution of the process that uses the external memory 325, and the task terminates.

In step S15, the display of the function that uses the external memory 325 is invalidated without displaying an alert message of the external memory 325 being left in place, on the display unit 111b of the console unit 111. It is thus possible to avoid informing a third party of the external memory 325 being left in place.

Figure 9:
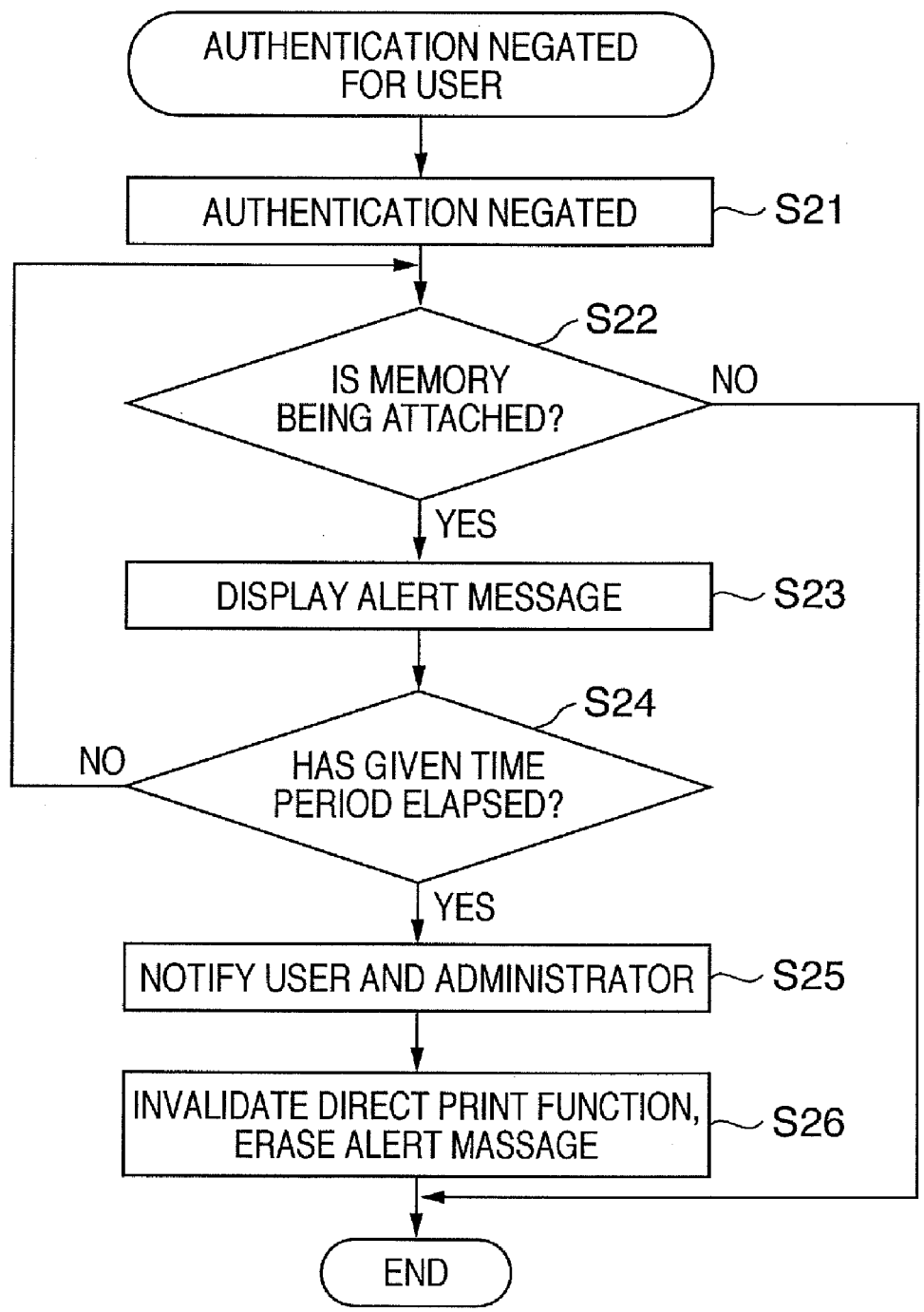
FIG. 9 is a flowchart explaining a control process of the external memory being left in place in the MFP when negating authentication, according to the embodiment.

FIG. 9 is a flowchart explaining a control process of the MFP in a case where the external memory 325 is left in place in the MFP 100 when negating the authentication, according to the embodiment. The process corresponds to the task sequence that invalidates the function that uses the external memory 325 by the CPU 311 of the MFP 100, in accordance with a control program that is stored in either the ROM 313 or the hard disk drive 323. Each respective step is implemented by the CPU 311 in accordance with the control program that is stored in either the ROM 313 or the control program that is loaded in the RAM 312 from the hard disk drive 323. The task runs when the authentication of a person such as the user is negated.

In step S21, the process responds to an operation of the user, such as an operation for going from the state of being authenticated to negating the authentication, for example, logging out, and verifying that the authentication has been negated. The process then proceeds to step S22, where it is determined whether or not the external memory 325 is attached to the removable media interface 112. If it is determined that the external memory 325 is attached, the process proceeds to step S23, whereas the task terminates if it is determined that the external memory 325 is not attached.

In step S23, the MFP 100 displays a message to the effect that the memory has been left in place, on the display unit 111b of the console unit 111, in order to get the user to remove the external memory 325, for example, in a window such as is depicted in FIG. 6. The process then proceeds to step S24, where the message is displayed until a given time period elapses. The determination of the passage of the given time period is made using the timer 321. When the given time period has elapsed, the process proceeds to step S25, where the display of the console unit 111 changes, for example, to a window such as is depicted in FIG. 5. In such a circumstance, the text data with the content such as is depicted in FIG. 7, for example, is created, based on the registration information of the authenticated user and the administrator of the MFP 100 is notified via the communication unit by a mode such as e-mail.

The process proceeds to step S26, wherein the alert message displayed in step S23 is erased, and the function that uses the external memory 325 is invalidated. For example, the control window showing the status of the external memory 325 as being attached, such as is depicted in FIG. 4, is changed to the control window that is the same as the status of the external memory 325 not being attached, such as is depicted in FIG. 5. It is thus rendered impossible to command the function, for example a direct printing function, that uses the external memory 325 from the menu window, and the task terminates.

The negation operation of the authentication of the user, in step S21, is performed by the user of the external memory 325, and thus, the alert message in step S23 is limited to being displayed to the user who is the owner of the external memory 325. When the given time period has elapsed from a timing of displaying the alert message, it is possible that the user is away from the MFP 100. Accordingly, the CPU 311 controls the apparatus so that the alert message on the display unit 111b disappears. It is thus impossible to command the function, for example a direct printing function, that uses the external memory 325, and a third party other than the user remains ignorant of the external memory 325 being left in place.

Figure 10:
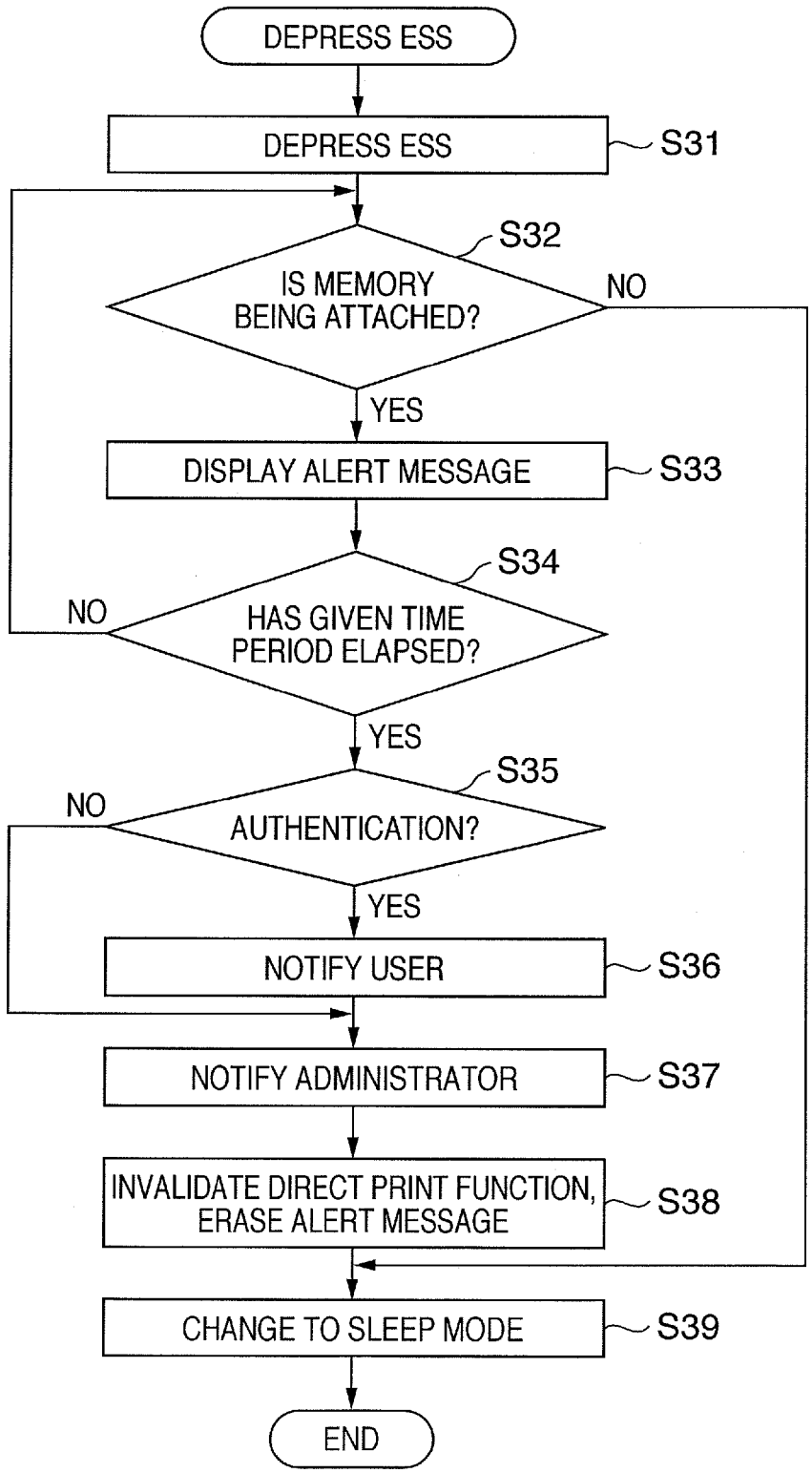
FIG. 10 is a flowchart explaining a control process of the external memory being left in place in the MFP when an ESS is depressed, according to the embodiment.

FIG. 10 is a flowchart explaining a control process of the MFP in a case where the external memory 325 is left in place in the MFP 100 when an ESS is depressed, according to the embodiment. The process sequence corresponds to the task sequence where the CPU 311 invalidates the function that uses the external memory by the CPU 311 of the MFP 100, in accordance with a control program that is stored in either the ROM 313 or the hard disk drive 323. Each respective step is implemented by the CPU 311 in accordance with the control program that is stored in either the ROM 313 or that is loaded into the RAM 312 from the hard disk drive 323. The task runs in a case that an energy saving switch (ESS), which is built into the console unit 111 and which changes the operating state of the MFP 100 into a sleep mode, is not depressed. The sleep mode is a power saving mode that reduces the power consumption of the MFP 100 by performing a control operation such as turning off the display unit 111b of the console unit 111.

In step S31, a verification that the ESS is depressed is performed. The process proceeds to step S32, where it is determined whether or not the external memory 325 is attached to the removable media interface 112. If it is determined that the external memory 325 is attached, the process proceeds to step S33. If it is determined that the external memory 325 is not attached, the process proceeds to step S39.

In step S33, the MFP 100 displays only such a message on the display unit 111b of the console unit 111 as is depicted in FIG. 6, in order to get the user to remove the external memory 325, and does not display the menu items 411-414 of the other functions. In step S34, the message is displayed until a given time period elapses, whereupon the process proceeds to step S35. The determination of the passage of the given time period is made in accordance with the timer 321.

In step S35, it is determined whether or not the user has been authenticated. If so, the process proceeds to step S36. If not, the process proceeds to step S37. In step S36, the text data with the content such as shown in FIG. 7, for example, is created, based on the registration information and the authenticated user is notified, via the communication unit, by a mode such as e-mail, that the external memory 325 has been left in place. The process then proceeds to step S37, where the administrator of the MFP 100 is notified, via the communication unit by a mode such as e-mail, of the external memory 325 being left in place. The process proceeds to step S38, where the alert message displayed on the display unit 111b in step S33 is erased. The menu of a function, for example, a direct printing function, that uses the external memory 325 is also erased, and the process proceeds to step S39, where the displayed items on the display unit 111b of the console unit 111 is erased, and the state of the MFP 100 is changed into the sleep mode, and the task terminates.

Since it is highly possible that the user depresses the ESS, it is thus very possible that the alert message will be displayed to the owner of the external memory 325. If, on the other hand, the given time period has elapsed from the timing of displaying the alert message, it is very probable that the owner of the external memory 325 is away from the MFP 100. Accordingly, in such a circumstance, the alert message disappears, the function that uses the external memory 325 is invalidated, and the state of the MFP 100 is changed into the sleep mode. Thus, when waking up from the sleep mode, the same control window is displayed as the state where the external memory 325 is not in place, such as is depicted in FIG. 5. It is thus impossible to command the process that uses the external memory 325, and a third party other than the user remains ignorant of the external memory 325 being left in place.

Figure 11:
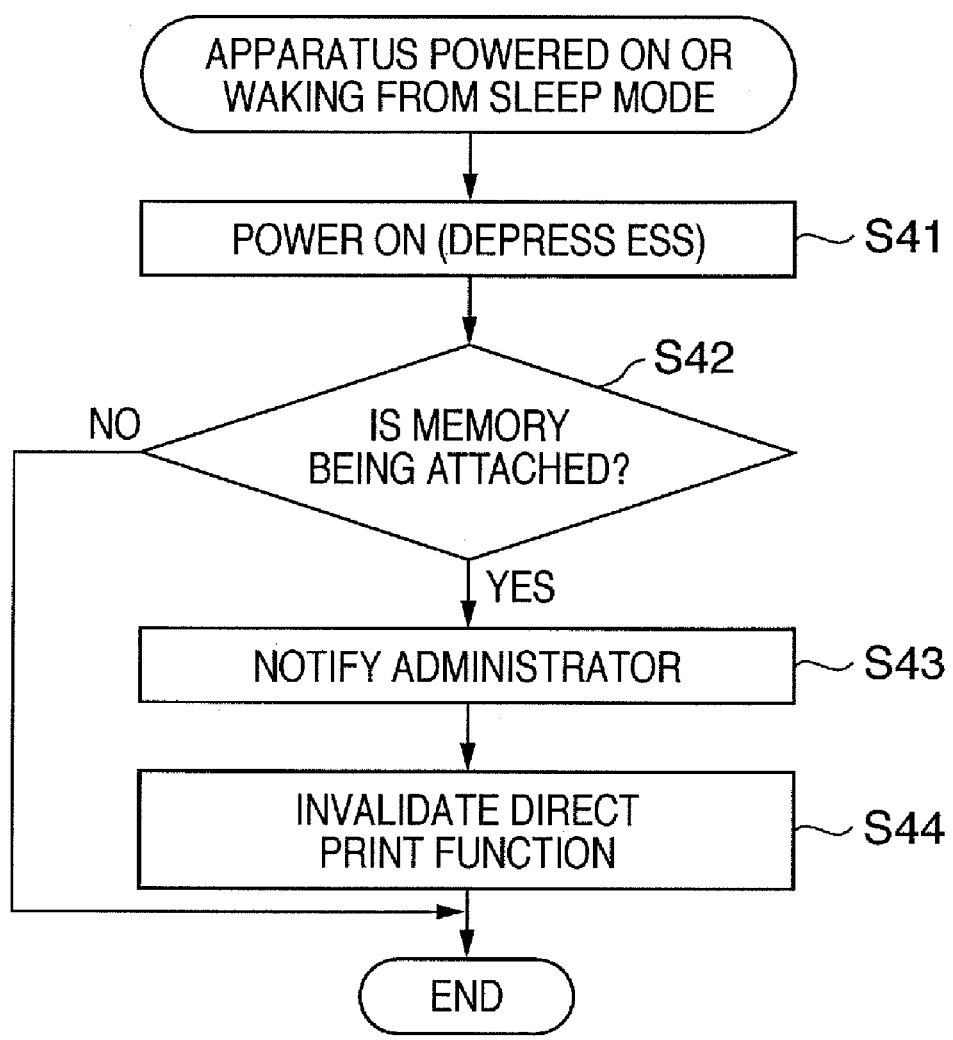
FIG. 11 is a flowchart explaining a control process of the external memory being left in place in the MFP when an electric power is powered on, according to the embodiment.

FIG. 11 is a flowchart explaining a control process of the external memory 325 being left in place in the MFP 100 when the MFP is powered on, according to the embodiment. The process corresponds to the task sequence that invalidates the function that uses the external memory by the CPU 311 of the MFP 100, in accordance with the control program that is stored in the ROM 313 or the control program that is loaded into the RAM 312 from the hard disk drive 323. The task runs when a primary power supply of the MFP 100 is powered on, or when the MFP 100 wakes up from the sleep mode.

In step S41, a verification is performed that either the power supply state of the MFP 100 is changed from power off state to power on state, or else that the MFP 100 has been commanded to wake up from the sleep mode by depressing the ESS. The process proceeds to step S42, where it is determined whether or not the external memory 325 is in place in the removable media interface 112. If it is determined that the external memory 325 is in place, the process proceeds to step S43. If it is determined that the external memory 325 is not in place, the task terminates. In step S43, the administrator who is registered in a memory such as the hard disk drive 323 is notified, via the communication unit by a mode such as e-mail, of the external memory 325 being left in place. The process proceeds to step S44, where commanding the function, for example a direct printing function, that uses the external memory 325 is invalidated, and the task terminates.

This configuration of the apparatus invalidates commanding the function that uses the external memory 325 when powering on the MFP 100 or waking the MFP 100 from the sleep mode, such as by setting the console window to the same state in a case that the external memory 325 is not in place, for example, as depicted in FIG. 5. It is thus possible to prevent a third party from noticing that the external memory 325 has been left in place.

According to the embodiment, it would be permissible to omit the e-mail communication process, in a case where the e-mail address or other address is not included in the user management, department management, or administrator registration information.

If the e-mail address of the owner of the external memory 325 is stored in the external memory 325 that is left in place, it would be permissible to treat the e-mail address that is stored in the external memory 325 as the recipient of the notification thereof.

It would be permissible to prohibit the removable media interface 112 from reading or writing data to the external memory 325 under the status of invalidating the function that uses the external memory 325.

It would be permissible for the user to set at will whether or not to invalidate the function that uses the external memory 325.

It would be possible to implement the negation of the state where the function that uses the external memory 325 is invalidated by either connecting a new external memory 325 to the removable media interface 112 or removing the invalidated external memory 325.

Other Embodiments

The embodiments of the present invention have been described in detail. It is to be understood, however, that it would be permissible to apply the present invention to a system that is configured from a plurality of devices, as well as to an apparatus that is configured of a single device.

The present invention may be achieved by supplying a software program that implements the functions of the embodiments, either directly or remotely, to the system or the apparatus, and having a computer of the system or the apparatus execute the program this supplied. In such a circumstance, the form of the software need not be a program, provided that the software possesses the function of a program.

Accordingly, the program code itself that is installed on the computer in order to implement the function process of the present invention implements the present invention. The computer program itself for implementing the function process of the present invention is included in the scope of the claims of the present invention. In such a circumstance, the form of the program may be of any configuration such as an object code, a program that is executed by an interpreter, or a script that is supplied to an operating system.

A wide range of recording media may be used to supply the program. Examples include a Floppy™ disk, a hard disk drive, an optical disk, a magneto-optical (MO) disk, a CD-ROM, a CD-R, a CD-RW, a magnetic tape, a nonvolatile memory card, a ROM, or DVD, i.e., a DVD-ROM or a DVD-R.

As another program supply method, it would be possible to supply the program by employing a Web browser on a client computer to connect to a website on the Internet, and download the program from the website to a recording medium such as a hard drive. In such a circumstance, it would be permissible for the download to be either the computer program of the present invention, or a compressed file that includes an automatic install function. Implementation would also be possible by segmenting the program that configures the present invention into a plurality of files, and downloading each file from a different webpage. The World Wide Web server that downloads the program file to a plurality of users that implements the function process of the present invention is included in the scope of the claims of the present invention.

It would be permissible to apply a format that encrypts and stores the program on a storage medium such as a CD-ROM for distribution to the user. In such a circumstance, the encrypted program is installed on the computer in an executable format by using key information that decrypts the encryption, which a user who satisfies a prescribed condition downloads from a website on the Internet.

It would be possible to implement the function of the embodiments in a manner other than the preceding by having the computer execute the loaded program. For example, it would be possible to implement the function of the embodiments by having an operating system or other software running on the computer execute the actual processing, in whole or in part, in accordance with the command of the program.

It would be permissible for the program that is read out from the recording medium to be loaded to a memory that is in an expansion board that is included in the computer or an expansion unit that is attached to the computer. In such a circumstance, the functions of the embodiments would be implemented by the CPU or other hardware on the expansion board or the expansion unit performing the actual process, in whole or in part, in accordance with the command of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-337586, filed Dec. 14, 2006, which is hereby incorporated by reference herein in its entirety.

What is claimed is:

1. A printing apparatus for printing an image on a print sheet in accordance with image data with a print unit, the apparatus comprising:
an authentication unit configured to authenticate a user for operating the printing apparatus;
an input unit configured to input a print instruction for operating the printing apparatus based on an operation by a user;
a memory connection unit configured to removably connect an external memory;
a control unit configured to control the print unit to execute a print process based on the image data stored in the external memory, in a case where a print instruction is inputted using the input unit by the user authenticated by the authentication unit to execute the print process based on the image data stored in the external memory;
a determination unit configured to determine whether or not a user of the printing apparatus is authenticated by the authentication unit in a case where the print instruction is not inputted by the input unit within a predetermined time period while the external memory is connected to the memory connection unit; and
a transmission unit configured to transmit a notification indicating that the external memory has been connected to the memory connection unit to a destination corresponding to the user authenticated by the authentication unit in a case that the determination unit determined that the user is authenticated by the authentication unit, and to transmit the notification indicating that the external memory has been connected to the memory connection unit to a predetermined destination in a case that the determination unit determined that the user is not authenticated by the authentication unit.

2. The printing apparatus according to claim 1, wherein the determination unit determines that the user is not authenticated in a case that the user does not log in.

3. The printing apparatus according to claim 2, further comprising a prohibition unit configured to prohibit the print process from being performed based on the image data stored in the external memory, in a case where the print instruction is not inputted by the input unit within the predetermined time period while the external memory is connected to the memory connection unit.

4. The printing apparatus according to claim 3, further comprising a setting unit configured to set the predetermined time period based on an operation by the user.

5. The printing apparatus according to claim 1, wherein the user is an administrator.

6. A control method of a printing apparatus having a memory connection unit for removably connecting an external memory storing image data, an authentication unit configured to authenticate a user for operating the printing apparatus and a print unit configured to perform a print process to print an image on a print sheet in accordance with the image data, the method comprising the steps of:

inputting a print instruction for operating the printing apparatus based on an operation by a user;

controlling the print unit to execute the print process based on the image data stored in the external memory, in a case where a print instruction is inputted in the inputting step by the user authenticated by the authentication unit to execute the print process based on the image data that is stored in the external memory;

determining whether or not a user of the printing apparatus is authenticated by the authentication unit in a case where the print instruction is not inputted in the inputting step within a predetermined time period while the external memory is connected to the memory connection unit; and transmitting a notification indicating that the external memory has been connected to the memory connection unit to a destination corresponding to the user authenticated by the authentication unit in a case that the determining step determined that the user is authenticated by the authentication unit, and transmitting the notification indicating that the external memory has been connected to the memory connection unit to a predetermined destination in a case that the determining step determined that the user is not authenticated by the authentication unit.

* * * * *